US012694871B2

(12) United States Patent
Lee et al.

(10) Patent No.: US 12,694,871 B2
(45) Date of Patent: Jul. 28, 2026

(54) REAL-TIME SUMMARIZATION OF VIRTUAL CONFERENCE TRANSCRIPTS

(71) Applicant: Zoom Video Communications, Inc., San Jose, CA (US)

(72) Inventors: Bilung Lee, San Jose, CA (US); Renjie Tao, Santa Clara, CA (US); Yun Zhang, Pittsburgh, PA (US)

(73) Assignee: Zoom Communications, Inc., San Jose, CA (US)

( * ) Notice: Subject to any disclaimer, the term of this patent is extended or adjusted under 35 U.S.C. 154(b) by 263 days.

(21) Appl. No.: 18/385,785

(22) Filed: Oct. 31, 2023

(65) Prior Publication Data

US 2025/0140246 A1 May 1, 2025

Related U.S. Application Data

(60) Provisional application No. 63/546,069, filed on Oct. 27, 2023.

(51) Int. Cl.
*G10L 15/22* (2006.01)
*G10L 15/04* (2013.01)
(Continued)

(52) U.S. Cl.
CPC ............ *G10L 15/183* (2013.01); *G10L 15/04* (2013.01); *G10L 15/22* (2013.01); *H04L 12/1831* (2013.01); *H04L 65/1089* (2013.01)

(58) Field of Classification Search
CPC ................................. G10L 15/26; G10L 15/22
See application file for complete search history.

(56) References Cited

U.S. PATENT DOCUMENTS

2014/0350930 A1* 11/2014 Cox ...................... G06Q 10/10
704/235
2015/0279390 A1* 10/2015 Mani .................... G06F 16/345
704/235
(Continued)

FOREIGN PATENT DOCUMENTS

CN 115088250 A 9/2022
WO 2021/183269 A1 9/2021

OTHER PUBLICATIONS

Schneider, Felix, and Marco Turchi. "Team Zoom@ AutoMin 2023: Utilizing Topic Segmentation And LLM Data Augmentation For Long-Form Meeting Summarization." INLG Sep. 11, 2023. (Year: 2023).*

(Continued)

*Primary Examiner* — Jialong He
(74) *Attorney, Agent, or Firm* — Kilpatrick Townsend & Stockton LLP

(57) ABSTRACT

One example method includes receiving, during a virtual conference from a client device, a request to generate a real-time summary of the virtual conference, a plurality of client devices participating in the virtual conference and exchanging audio and video streams; receiving, during the virtual conference, a plurality of utterances generated by automatic speech recognition ("ASR") of the audio streams; generating a group of consecutive utterances from the plurality of utterances; determining a segment based on the group of consecutive utterances; generating, using a large language model ("LLM"), a segment summary based on the segment; and providing the segment summary to the client device.

17 Claims, 7 Drawing Sheets

(51) Int. Cl.
   *G10L 15/183*     (2013.01)
   *H04L 12/18*     (2006.01)
   *H04L 65/1089*    (2022.01)

(56)             References Cited

U.S. PATENT DOCUMENTS

| | | | |
|---|---|---|---|
| 2020/0105274 A1* | 4/2020 | Joller | G10L 25/63 |
| 2020/0349949 A1 | 11/2020 | Yoshioka et al. | |
| 2023/0367960 A1* | 11/2023 | Smus | G06F 40/166 |
| 2025/0260790 A1 | 8/2025 | Giovanardi et al. | |

OTHER PUBLICATIONS

International Search Report & Written Opinion for PCT/US2024/046143 mailed Dec. 17, 2024.

\* cited by examiner

RECEIVING REQUEST TO GENERATE REAL-
TIME SUMMARY
510

RECEIVE UTTERANCES FROM SPEECH
RECOGNITION
520

GENERATE A GROUP OF CONSECUTIVE
UTTERANCES
530

DETERMINING A CONTENT SEGMENT BASED
ON THE GROUP OF UTTERANCES
540

GENERATE A SEGMENT SUMMARY BASED ON
THE CONTENT SEGMENT
550

PROVIDE SEGMENT SUMMARY
560

REAL-TIME SUMMARIZATION OF VIRTUAL CONFERENCE TRANSCRIPTS

RELATED APPLICATIONS

This application claims priority to U.S. Application No. 63/546,069 entitled, "REAL-TIME SUMMARIZATION OF VIRTUAL CONFERENCE TRANSCRIPTS", filed on Oct. 27, 2023, the entirety of which is incorporated herein.

FIELD

The present application generally relates to virtual conferencing, and more particularly relates to real-time summarization of virtual conference transcripts.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
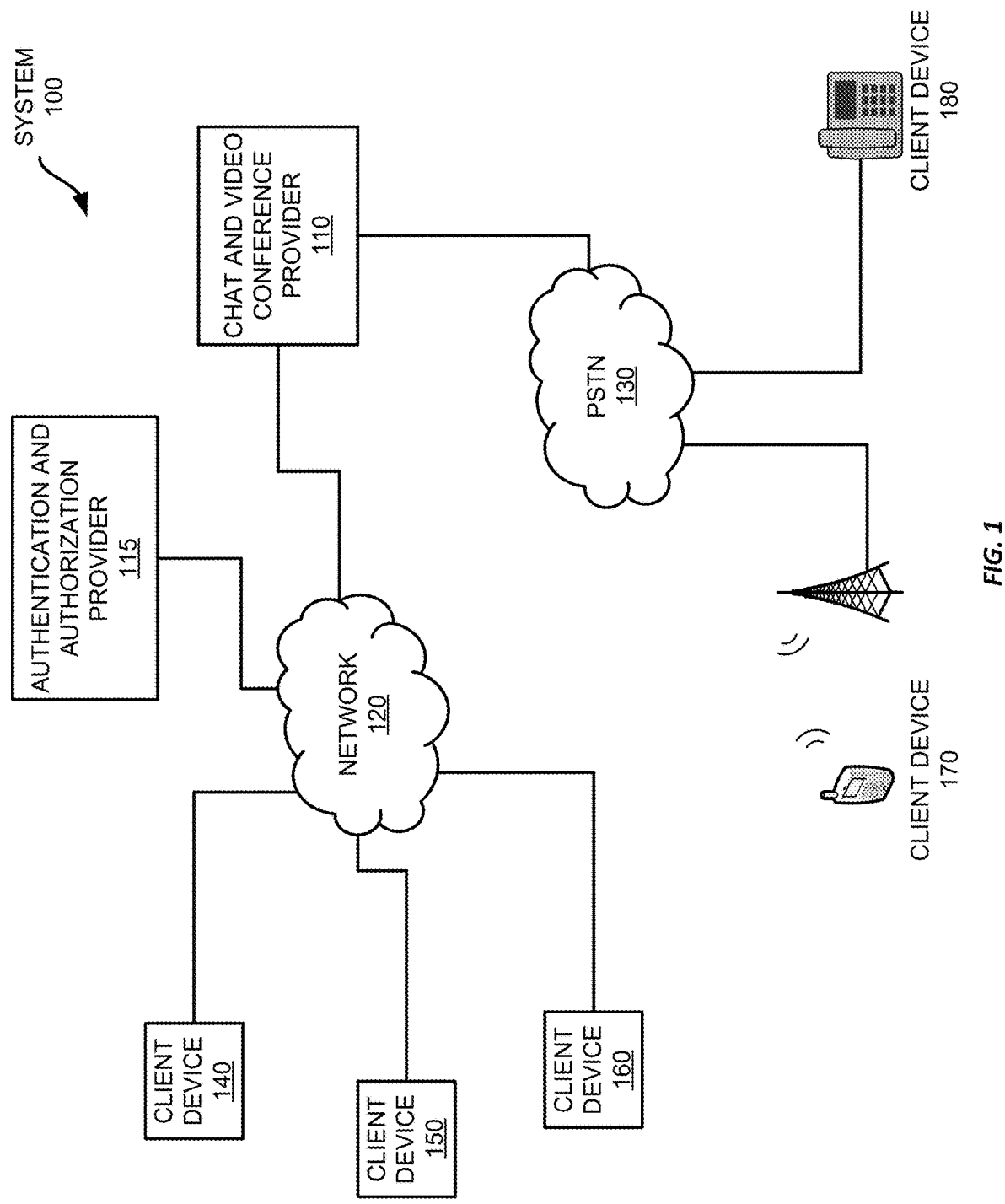
FIGS. 1-2 show example systems for real-time summarization of virtual conference transcripts.

Examples are described herein in the context of real-time summarization of virtual conference transcripts. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

During a virtual conference (or "meeting"), a user may be distracted or otherwise lose focus on the meeting, or the user may wish to keep tabs on a meeting that they are largely observing, rather than participating in. For such participants, because they may not be paying close attention to the meeting, they may lose track of what is being discussed at any given time. Or in some cases, participants may wish to keep notes about the meeting to assist with other future tasks. To help facilitate their engagement with the meeting, the virtual conference provider provides real-time summaries of the meeting as it proceeds.

To do so, the virtual conference provider obtains permission from each of the participants to generate a transcript of the meeting and, after obtaining that permission, it begins performing automatic speech recognition ("ASR") on audio streams from the various participants in the meeting. As the transcript is generated over time, the utterances from the various participants accumulate in the transcript, which is monitored by a process that captures groups of utterances, also referred to as "chunks," based on a threshold for summarization.

Once a chunk has been generated, the process obtains the chunk and provides it to a segmentation process, which employs a trained machine-learning ("ML") model to identify groups of utterances related to a common topic that can be grouped together for summarization. This may involve all of the utterance within the chunk or only a portion of them. But if the utterances can be grouped into a coherent segment, the group of utterances from the group are then provided to a large language model ("LLM") to generate a summary of the segment, which is output for one or more participants in the meeting. The summary may include other information, such as timestamps corresponding to the group of utterances used to generate the summary, the people speaking during the segment, and other related information. If not all of the utterances from the chunk are used to generate the segment, the remaining utterances can then be included with the next chunk for future analysis and summarization.

By generating real-time summaries of segments of the meeting, participants in the meeting can follow the trajectory of the meeting or can more easily take notes about the discussions that take place. Segmenting the recognized speech based on semantic or other information can facilitate generating a coherent summary for the participants, which may enable better engagement with the meeting.

This illustrative example is given to introduce the reader to the general subject matter discussed herein and the disclosure is not limited to this example. The following sections describe various additional non-limiting examples and examples of real-time summarization of virtual conference transcripts.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
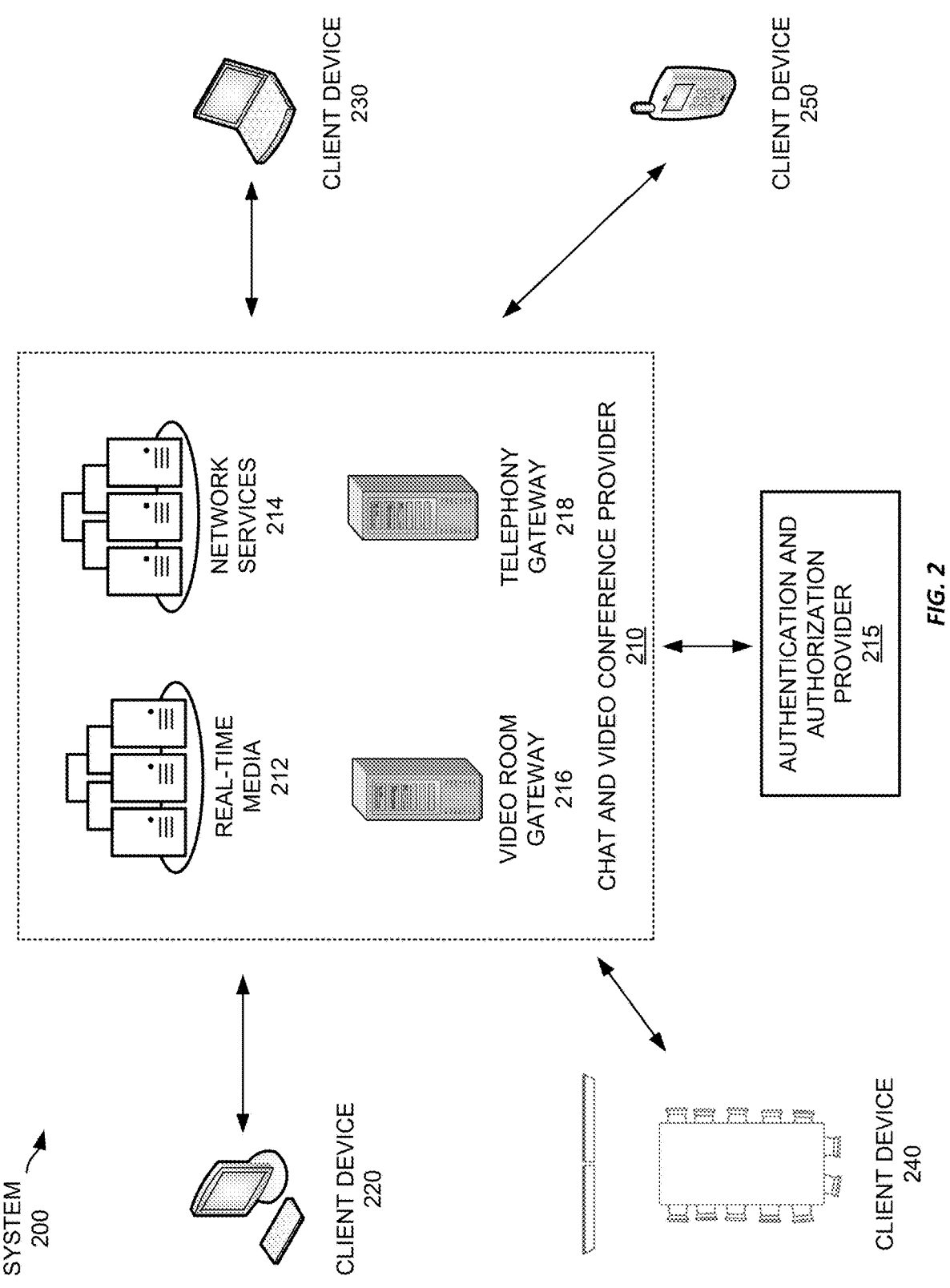

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory, and network I/O) as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
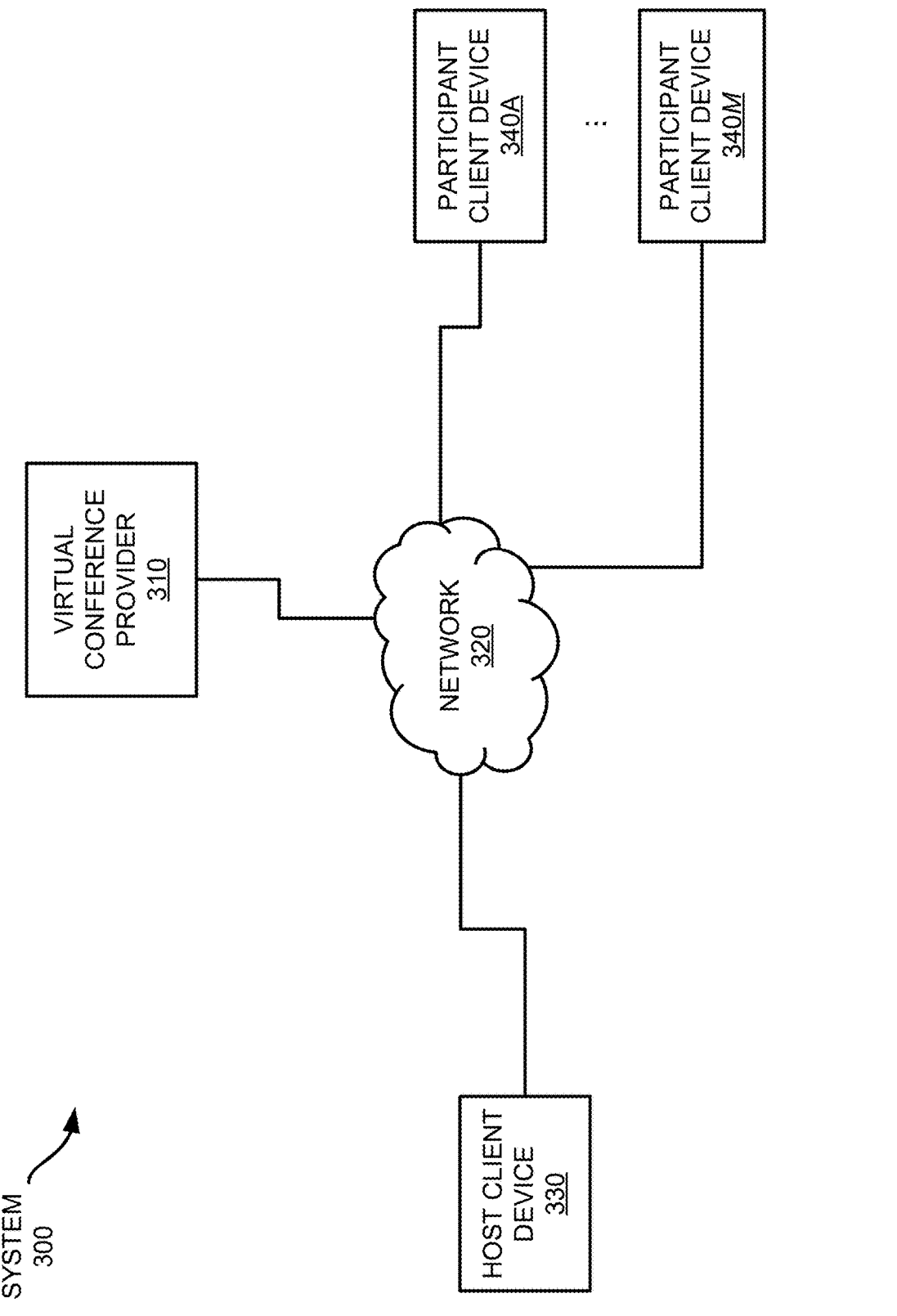
FIGS. 3A-3B show an example system for real-time summarization of virtual conference transcripts.
Figure 3B:
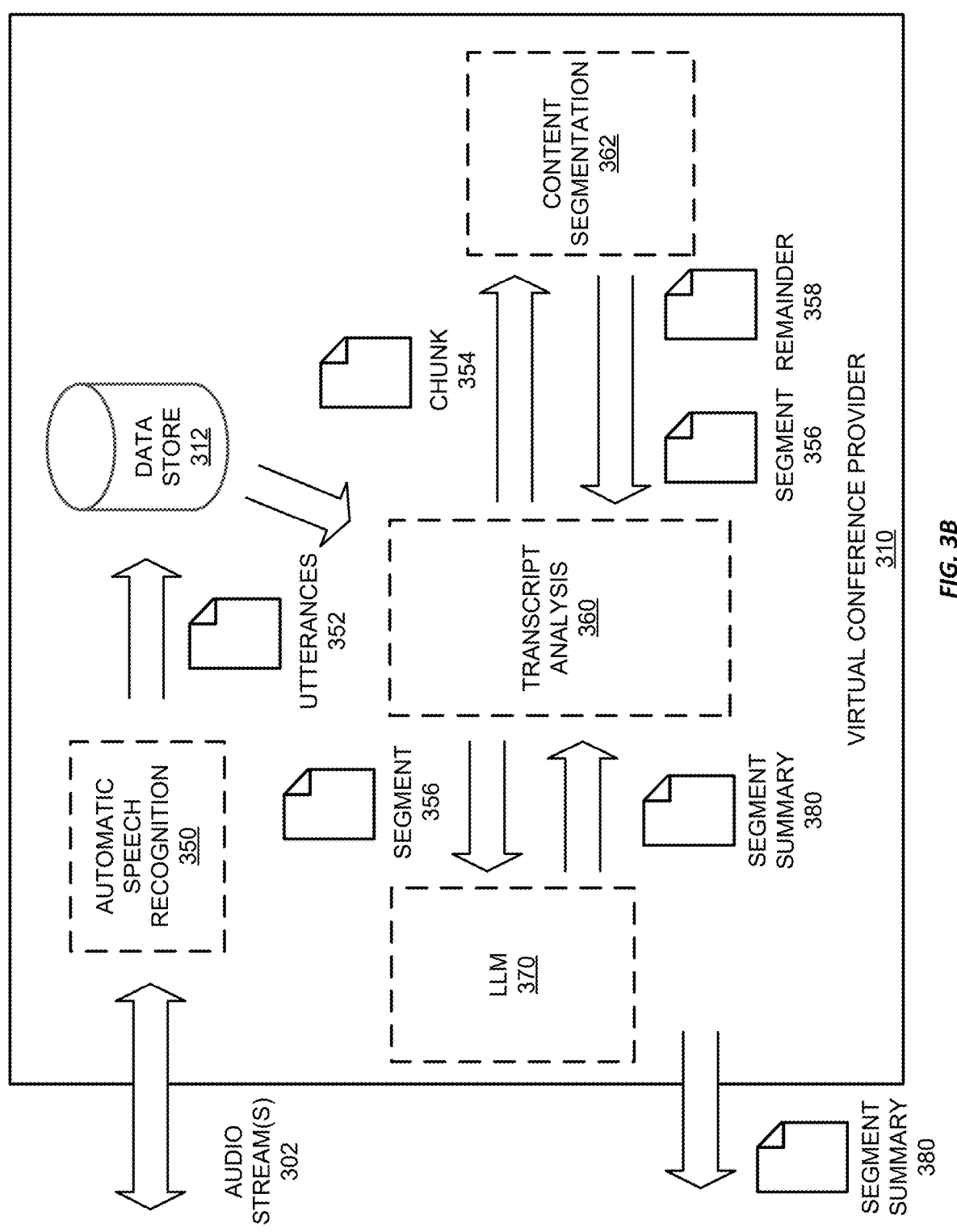

Referring now to FIGS. 3A-3B, FIG. 3A shows an example system 300 for real-time summarization of virtual conference transcripts. The system 300 includes a virtual conference provider 310, which can be connected to multiple client device 330, 340a-n via one or more intervening communication networks 320. In this example, the communications network 320 is the internet, however, any suitable communications network or combination of communications network may be employed, including LANs (e.g., within a corporate private LAN), WANs, etc.

Each client device 330, 340a-n executes virtual conference software that connects to the virtual conference provider 310 and joins a meeting. During the meeting, the various participants (using virtual conference software or "client software" at their respective client devices 330, 340a-n) are able to interact with each other to conduct the meeting, such as by viewing video feeds and hearing audio feeds from other participants, and by capturing and transmitting video and audio of themselves.

The user of the host client device 330 may initiate a virtual conference with other users at other client device 340a-m to discuss any matters of interest, which are recorded in a transcript over the course of the meeting, which may include the participants agreeing to having the meeting transcribed. For example, the participants may be part of a technical team discussing the designs of various aspects of a particular project. The meeting may be transcribed to allow the participants to review the transcript after the meeting, but it may also enable the use of real-time summaries. In some cases, the participants may consent to real-time summarization, but without retaining a transcript after the meeting concludes. In one such example, the virtual conference provider 310 may generate a transcript while providing real-time summarization, but may delete the portions of the transcript once a summary of those portions has been generated. Further, in some examples, the virtual conference provider 310 may generate a transcript during the virtual conference and, once the virtual conference has concluded, then delete the transcript.

During the virtual conference, the virtual conference provider 310 performs ASR on incoming audio streams from the participants to generate text corresponding to utterances made by the various participants. Utterances can be full sentences or parts of sentences, such as clauses or phrases that may occur during ordinary conversation. For example, a user may express a thought in a sentence, and thus the sentence may then be identified as a single utterance. However, an utterance may include any suitable amount of recognized speech according to different examples.

As utterances are generated over time by the ASR functionality, the virtual conference provider 310 determines when enough utterances have accumulated to generate a segment, such as based on a threshold. The accumulated utterances are then provided to a trained ML model to perform content segmentation. The ML model accepts the utterances as input and determines a content segment based on them. The segment may represent all of the utterances or only some of them. If not all of the utterances are used, the unused utterances will be re-grouped with the next set of utterances for a future segment.

After a segment is generated, it is provided to a LLM to generate a summary of the segment. The summary is then provided to one or more participants in the virtual conference. The process then repeats for new utterances and chunks as they are generated from the audio during the virtual conference.

Referring now to FIG. 3B, FIG. 3B shows the virtual conference provider 310 shown in FIG. 3B, though it should be understood that any suitable computing device hosted by any entity, including a client device, may be used. The virtual conference provider 310 includes a data store 312, ASR functionality 350, transcript analysis system 360, content segmentation 362, and an LLM 370. It should be appreciated that in some examples, the LLM 370 may be hosted by a third party at a remote server.

In general, the virtual conference provider 310 receives audio streams 302 (as well as video streams) during a virtual conference from the participants, which it also transmits to the participants in the virtual conference to enable them to interact with each other, generally as described above with respect to FIGS. 1-2. If the participants agree, the virtual conference provider 310 can also generate a transcript of the virtual conference by providing incoming audio streams to ASR functionality 350. After the virtual conference concludes, the transcript is completed and stored in the data store 312, where it is associated with the completed virtual conference, if the participants have consent to persistent storage of the transcript. In examples, where participants have consented to real-time summarization, but not persistent storage of the transcript, utterances from the ASR functionality 350 may only be retained long enough to generate a segment and a corresponding summary. Alternatively, the transcript may be maintained until the end of the virtual conference, at which time it is discarded.

During the virtual conference, the ASR functionality 350 processes incoming audio streams 302 and generates text corresponding to speech from the audio streams. The text is then grouped into utterances 352 that are stored in a data-store 312 until a sufficient number of utterances are available to form a "chunk" have been stored. The size of a chunk is configurable may be selected based on an amount of elapsed time, a number of utterances generated, a size of the generated utterances (e.g., a number of words, phrases, sentences, etc.), or any other suitable metric or combination of metrics. A chunk 354 is then obtained by the transcript analysis 360 and provided to the content segmentation functionality 362.

In this example, the content segmentation functionality 362 receives the chunk 354 and determines whether a content segment can be identified from the utterances within the chunk, and if so, it generates a content segment 356 comprising the relevant utterances. In this example, the content segmentation functionality 362 comprises or interacts with an ML model, e.g., an LLM, that has been trained to perform semantic analysis of the utterances within the chunk and to identify common subject matter between the utterances. If enough utterances are semantically related, the content segmentation functionality 362 will output a segment that includes those utterances. If any utterances are not semantically related or are semantically related to a different topic, those remaining utterances may be identified as the "remainder" utterances. The remainder utterances may then be used with subsequently received utterances to identify a new segment. Or, if no more chunks are available, the remainder chunks may be collected and output as a separate segment.

An identified segment 356 and remainder 358, if any, are then provided to the transcript analysis functionality 360, which provides the segment 356 to an LLM 370 to generate a summary 380 of the segment. The transcript analysis functionality 360 receives the segment summary 380 and provides it to one or more of the participants in the meeting, such as in response to a request from a participant for real-time summarization.

Figure 4:
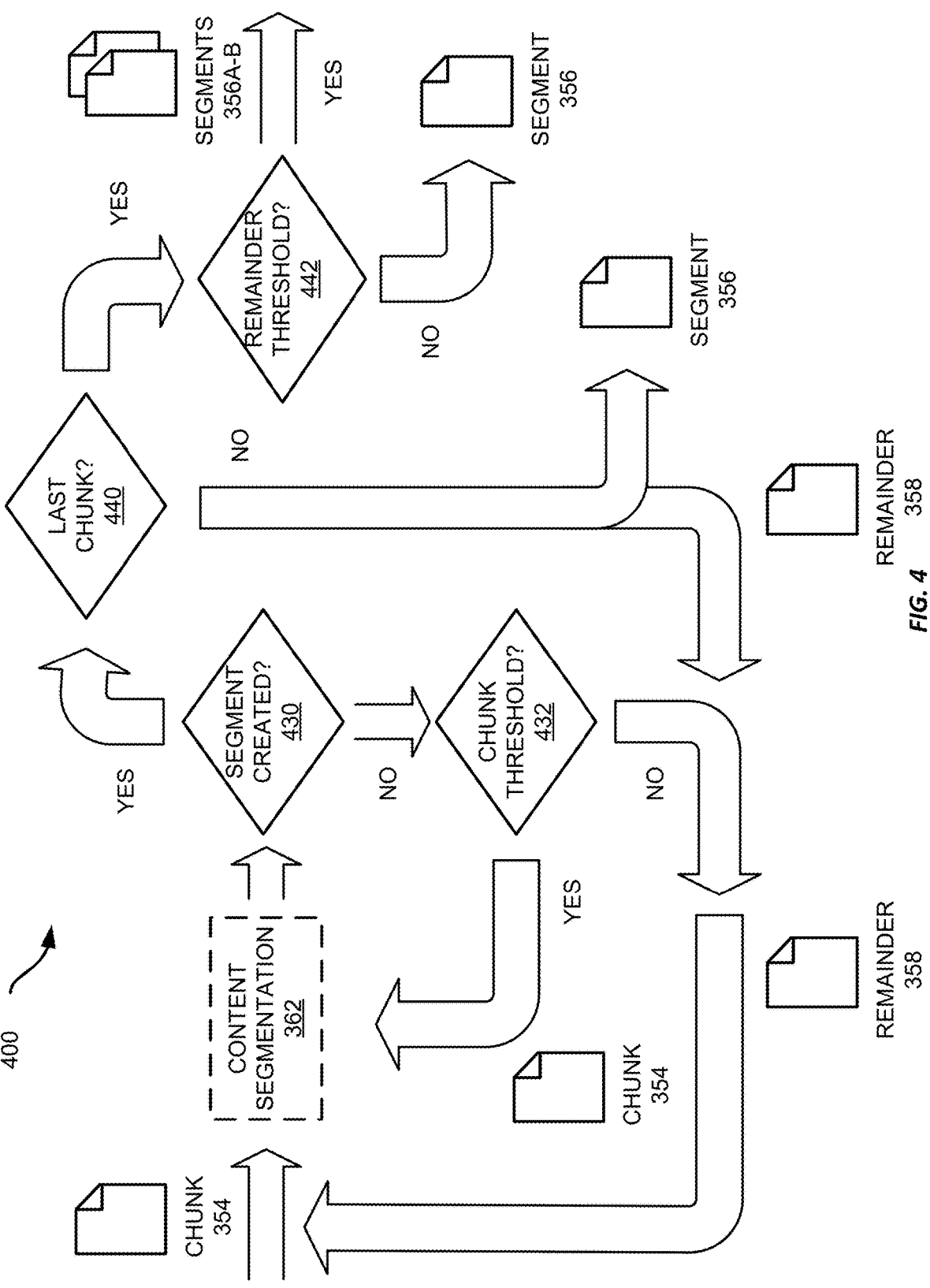
FIG. 4 shows an example process flow for real-time summarization of virtual conference transcripts.

Referring now to FIG. 4, FIG. 4 shows an example process flow 400 for real-time summarization of virtual conference transcripts. The example process flow 400 will be discussed with respect to the system 300 shown in FIGS. 3A-3B, but it should be appreciated that any suitable system according to this disclosure may be employed.

In this example, a chunk 354 of utterances 352 is provided to the content segmentation functionality 362 by transcript analysis functionality 360. The content segmentation functionality 362 responds with a segment or an indication that no segment could be created. At block 430, if a segment was created, the process 400 proceeds to block 440, otherwise it proceeds to block 432.

When a segment 356 is created, the transcript analysis functionality 360 determines whether the chunk 354 was the last chunk 440 or if additional chunks will be available, e.g., because more utterances or chunks are stored in the data store 312 or because the meeting is still on-going. If the chunk 354 is not the last chunk 440, the segment 356 is outputted and the remainder 358, if any, is saved and combined with the next chunk 354 to be processed.

If a segment 356 is created and the current chunk is the last chunk to be processed, the transcript analysis functionality 360 determines whether any remainder 358 is greater than a predetermined threshold at block 442. Such a threshold may be a number of utterances, a duration of time, a number of words (or phrases or sentences) in the remainder, or any other metric or combination of metrics. If the remainder 358 satisfies the threshold, it is converted into a segment and the originally generated segment 356a and the segment 356b created from the remainder 358 are both output as segments. However, if the remainder 358 does not satisfy the threshold, it is appended to the segment 356 to create an augmented segment, and the augmented segment is output.

If the content segmentation functionality 362 does not generate a segment, the transcript analysis functionality 360 determines whether the chunk 354 satisfies a chunk size threshold at block 432. Such a threshold may be a number of utterances, a duration of time, a number of words (or phrases or sentences) in the utterances, or any other metric or combination of metrics.

If the chunk 354 satisfies the threshold at block 432, the chunk 354 is provided to the content segmentation functionality 362 again, however, a content segmentation threshold configuration for the content segmentation functionality 362 is reduced. Such a threshold may indicate a tolerance for close semantic or topical relationships. Thus, if a segment is not generated, the content segmentation functionality 362 may have determined that a group of the utterances was not sufficiently related to correspond to a segment. However, by reducing the requirement or tolerance for topical or semantic relationship between the utterances, the content segmentation functionality 362 may be more likely to generate a segment based on the chunk 354. In this example, the reduction is only for the chunk 354 and is reverted to the original threshold for the next chunk 354, though in some examples, the reduced threshold may be maintained for subsequent chunks. The process 400 returns to block 430 after the content segmentation functionality 362 has processed the chunk 354 using the reduced content segmentation threshold.

The transcript analysis functionality 360 may iteratively reduce the threshold for a particular chunk 354 until a segment is created, or until a threshold number of iterations has occurred, at which time, the chunk 354 may be combined with the next chunk and provided to the content segmentation functionality 362 to process the next chunk.

Once the chunk 354 has been processed, any resulting segment(s) 356 are outputted and any remainder 358 is added to the next chunk for processing. By iteratively performing such a process flow 400, the virtual conference provider 310 can generate segments for summarization throughout the course of the meeting, which summaries can then be provided to one or more of the participants. Thus, those participants will receive real-time summaries of the meeting as it progresses.

Figure 5:
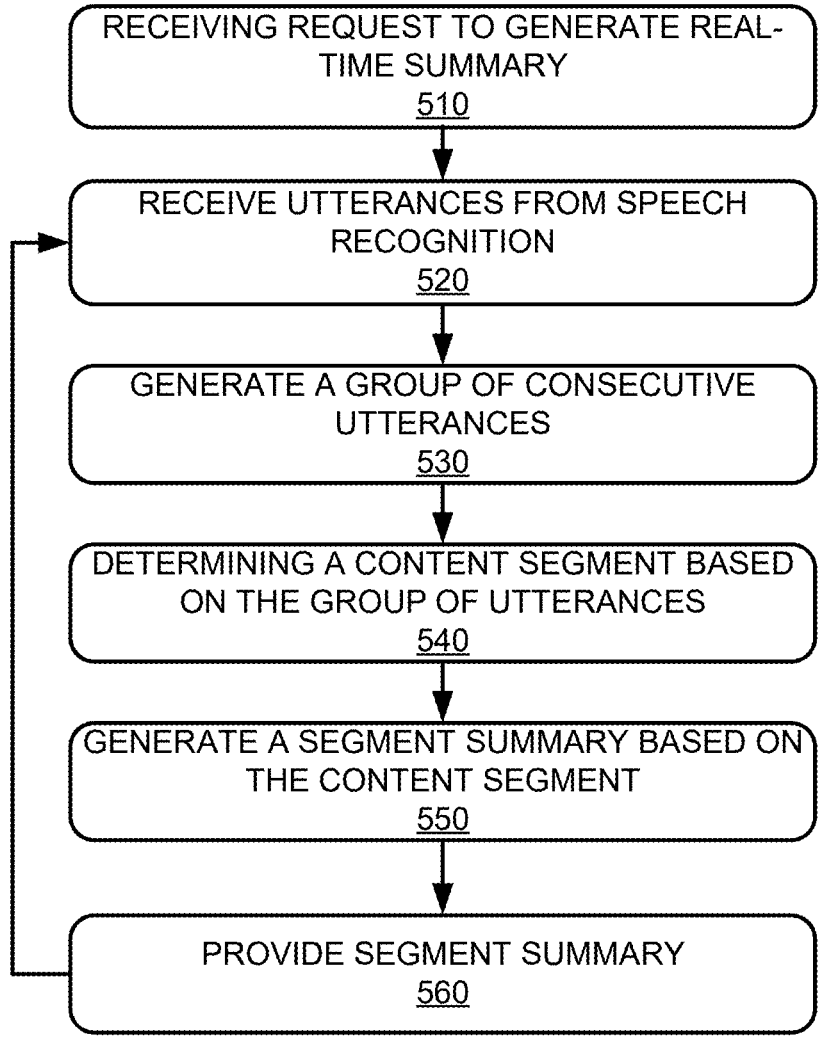
FIG. 5 shows an example method for real-time summarization of virtual conference transcripts.

Referring now to FIG. 5, FIG. 5 shows an example method 500 for real-time summarization of virtual conference transcripts. The example method 500 will be described with respect to the system 300 shown in FIGS. 3A-3B and the process flow 400 shown in FIG. 400; however, any suitable system may be employed according to different examples.

At block 510, the virtual conference provider 310 receives a request to generate a real-time summary from one or more client devices connected to a virtual conference hosted by the virtual conference provider 310. For example, a user may select an opinion in a graphical user interface ("GUI") to obtain a real-time summary of the meeting, which causes the client device to transmit the request to the virtual conference provider 310. The virtual conference provider 310 may then request the other participants to consent to generating a transcript from the virtual conference. The participants may consent to a persistent transcript that will be saved after the meeting ends, or they may consent to a transient transcript that will be discarded after being processed.

At block 520, the virtual conference provider 310 receives utterances 352 from ASR functionality 350 and stores them before providing them to the transcript analysis functionality 360, generally as described above with respect to FIG. 3B. To obtain the utterances, the virtual conference provider 310 provides audio data from one or more audio streams 302 received from client devices 330, 340a-m that are participating in a meeting. The ASR functionality 350 receives the audio data and generates text corresponding to recognized words from speech contained within the audio data. The text can be grouped by the virtual conference provider 310, such as into phrases or sentences, to form utterances, which are then stored in the data store. The virtual conference provider 310 may use any suitable technique to generate utterances

352 from the recognized speech, such as one or more trained ML models, e.g., an LLM 370.

At block 530, the virtual conference provider 310 generates a group of utterances from the utterances 352 stored in the datastore 312. In this example, the virtual conference provider 310 obtains utterances 352 from the datastore 312 until a threshold has been reached. Such a threshold may be a number of utterances, a duration of time, a number of words in the utterances, or any other metric or combination of metrics. In this example, the group of utterances is consecutive, though it should be appreciated that utterances may not be consecutive. For example, one or more utterances may be omitted in some examples. Often times, one person may be speaking, while one or more others may verbalize agreement or disagreement, but without interrupting the speaker. In some cases, another person may attempt to interrupt the speaker, intentionally or otherwise, but may stop without doing so. Such utterances may be captured by the virtual conference provider 310, but omitted based on an ML analysis of their semantic content or relationship to utterances from the participant who was identified as a speaker. For example, the virtual conference provider may determine that after recognizing speech for a first participant, another participant contributes some speech, while the first participant continues to speak. Thus, the speech from the other participant may be determined to be an utterance, but one to be omitted from a group of utterances.

Once the threshold has been satisfied, the virtual conference provider 310 may generate a group of utterances. In this example, such a group of utterances may be referred to as a chunk.

At block 540, the virtual conference provider 310 determines a segment 356 based on the group of utterances. In this example, the virtual conference provider 310 employs the transcript analysis functionality 360 to determine a segment 356, generally as discussed above with respect to FIG. 4. However, other process flows may be employed.

At block 550, the virtual conference provider 310 generates a segment summary based on the segment using a LLM 370. As discussed above, the transcript analysis functionality 360 may employ content segmentation functionality 362 to generate segments based on groups of utterances. The segments 356 may then be provided to the LLM 370 to generate summaries of the segments 356.

At block 560, the virtual conference provider 310 provides the segment summary 380 to one or more participants in the virtual conference. For example, the segment summaries 380 may be provided to the participant(s) who requested real-time summaries. In some examples, the segment summaries 380 may be provided to all participants in the meeting, or only to certain participants, such as the host or a presenter within the meeting. The method then returns to block 520 to receive additional utterances. It should be appreciated, however, that blocks 520-530 may continuously occur even while the transcript analysis functionality 360 processes one chunk 354. Thus, while the method 300 is depicted as progressing in a particular order, some portions of the method 300 may occur asynchronously to other portions.

Figure 6:
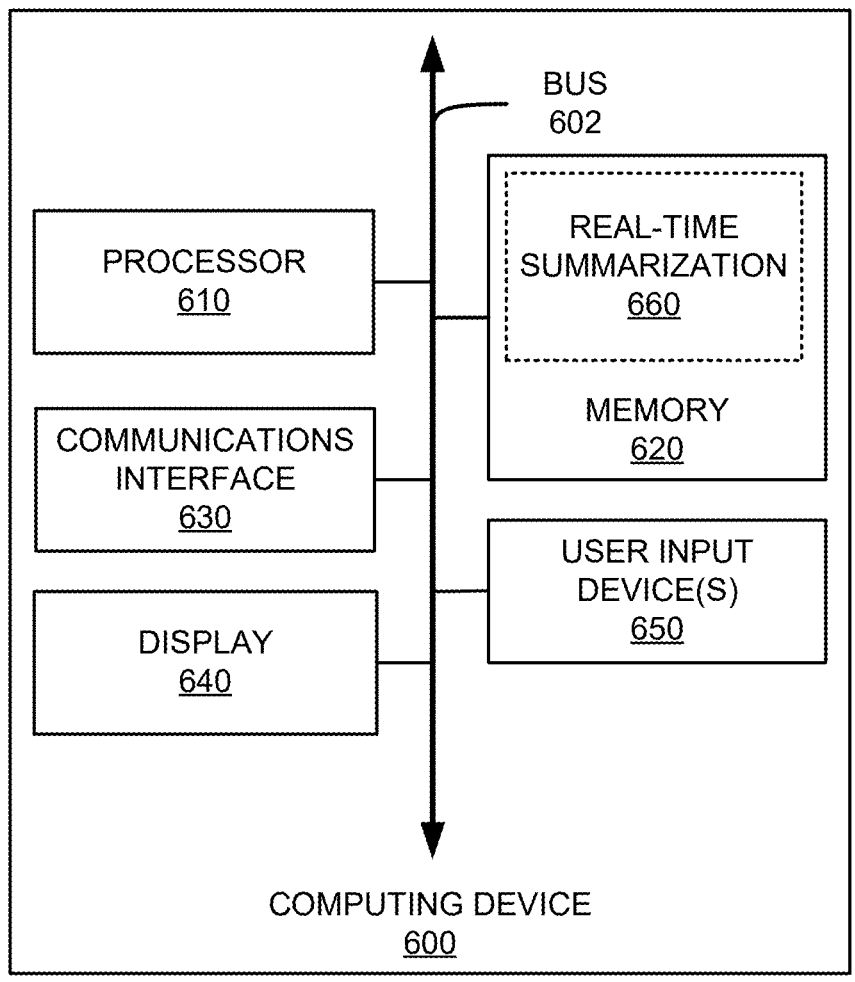
FIG. 6 shows an example computing device suitable for use with example systems and methods for real-time summarization of virtual conference transcripts.

Referring now to FIG. 6, FIG. 6 shows an example computing device 600 suitable for use in example systems or methods for real-time summarization of virtual conference transcripts according to this disclosure. The example computing device 600 includes a processor 610 which is in communication with the memory 620 and other components of the computing device 600 using one or more communications buses 602. The processor 610 is configured to execute processor-executable instructions stored in the memory 620 to perform one or more methods for real-time summarization of virtual conference transcripts according to different examples, such as part or all of the example method described above with respect to FIG. 5. The computing device 600, in this example, also includes one or more user input devices 650, such as a keyboard, mouse, touchscreen, microphone, etc., to accept user input. The computing device 600 also includes a display 640 to provide visual output to a user. In addition, the computing device 600 includes real-time summarization software 660, such as described above with respect to FIGS. 3A-3B, 4, and 5, to provide real-time summarization of virtual conference transcripts.

The computing device 600 also includes a communications interface 640. In some examples, the communications interface 630 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
   receiving, during a virtual conference from a client device, a request to generate a real-time summary of the virtual conference, a plurality of client devices participating in the virtual conference and exchanging audio and video streams;
   receiving, during the virtual conference, audio streams from the plurality of client devices participating the virtual conference;
   executing, during the virtual conference, an automatic speech recognition ("ASR") model on the audio streams to generate a plurality of utterances from one or more participants;
   generating a group of consecutive utterances from the plurality of utterances;
   executing a trained machine learning ("ML") model to generate a content segment based on the group of consecutive utterances and a segmentation threshold;
   receiving an indication that the content segment was not generated;
   determining that the group of consecutive utterances satisfies a chunk size threshold;
   reducing the segmentation threshold to obtain a reduced segmentation threshold;
   executing the trained ML model to generate the content segment based on the group of consecutive utterances and the reduced segmentation threshold;
   executing a large language model ("LLM") to generate a segment summary based on the content segment; and
   providing the segment summary to the client device during the virtual conference.

2. The method of claim 1, wherein the content segment comprises a subset of the group of consecutive utterances, wherein the subset comprises less than all of the utterances in the group of consecutive utterances and a remainder comprises the utterances from the group of consecutive utterances not included in the subset, further comprising:

receiving a second plurality of utterances generated by the ASR model of the audio streams;

generating a second group of consecutive utterances from the second plurality of utterances and the remainder;

determining a second segment based on the second group of consecutive utterances;

generating, using the LLM, a second segment summary based on the second segment; and providing the second segment summary to the client device.

3. The method of claim 1, further comprising:

determining that the group of consecutive utterances does not satisfy the chunk size threshold;

receiving a second plurality of utterances generated by the ASR model of the audio streams;

generating a second group of consecutive utterances from the second plurality of utterances and the group of consecutive utterances;

determining a second segment based on the second group of consecutive utterances;

generating, using the LLM, a second segment summary based on the second segment; and providing the second segment summary to the client device.

4. The method of claim 1, wherein the content segment comprises a subset of the group of consecutive utterances, wherein the subset comprises less than all of the utterances in the group of consecutive utterances and a remainder comprises the utterances from the group of consecutive utterances not included in the subset, further comprising:

determining that the remainder satisfies the chunk size threshold;

generating a second segment based on the remainder;

generating, using the LLM, a second segment summary based on the second segment; and providing the second segment summary to the client device.

5. The method of claim 1, wherein the content segment comprises a subset of the group of consecutive utterances, wherein the subset comprises less than all of the utterances in the group of consecutive utterances and a remainder comprises the utterances from the group of consecutive utterances not included in the subset, further comprising:

in response to determining that a virtual conference has concluded: determining that the remainder does not satisfy the chunk size threshold; and adding the remainder to the content segment.

6. The method of claim 1, wherein the chunk size threshold comprises a minimum elapsed time, a maximum elapsed time, a minimum number of utterances, a maximum number of utterances, a minimum size for the group of consecutive utterances, or a maximum size for the group of consecutive utterances.

7. A system comprising:

a communications interface;

a non-transitory computer-readable medium; and one or more processors configured to execute processor-executable instructions stored in the non-transitory computer-readable medium to:

receive, during a virtual conference from a client device, a request to generate a real-time summary of the virtual conference, a plurality of client devices participating in the virtual conference and exchanging audio and video streams;

receive, during the virtual conference, audio streams from the plurality of client devices participating the virtual conference;

execute, during the virtual conference, an automatic speech recognition ("ASR") model on the audio streams to generate a plurality of utterances from one or more participants;

generate a group of consecutive utterances from the plurality of utterances;

executing a trained machine learning ("ML") model to determine a content segment based on the group of consecutive utterances and a segmentation threshold;

receive an indication that the content segment was not generated;

determine that the group of consecutive utterances satisfies a chunk size threshold;

reduce the segmentation threshold to obtain a reduced segmentation threshold;

execute the trained ML model to generate the content segment based on the group of consecutive utterances and the reduced segmentation threshold;

generate, using a large language model ("LLM"), a segment summary based on the content segment; and provide the segment summary to the client device during the virtual conference.

8. The system of claim 7, wherein the content segment comprises a subset of the group of consecutive utterances, wherein the subset comprises less than all of the utterances in the group of consecutive utterances and a remainder comprises the utterances from the group of consecutive utterances not included in the subset, and wherein the one or more processors are configured to execute further processor-executable instructions stored in the non-transitory computer-readable medium to:

receive a second plurality of utterances generated by the ASR model of the audio streams;

generate a second group of consecutive utterances from the second plurality of utterances and the remainder;

determine a second segment based on the second group of consecutive utterances;

generate, using the LLM, a second segment summary based on the second segment; and provide the second segment summary to the client device.

9. The system of claim 7, wherein the one or more processors are configured to execute further processor-executable instructions stored in the non-transitory computer-readable medium to:

determining that the group of consecutive utterances does not satisfy the chunk size threshold;

receiving a second plurality of utterances generated by the ASR model of the audio streams;

generating a second group of consecutive utterances from the second plurality of utterances and the group of consecutive utterances;

determining a second segment based on the second group of consecutive utterances;

generate, using the LLM, a second segment summary based on the second segment; and provide the second segment summary to the client device.

10. The system of claim 7, wherein the content segment comprises a subset of the group of consecutive utterances, wherein the subset comprises less than all of the utterances in the group of consecutive utterances and a remainder comprises the utterances from the group of consecutive utterances not included in the subset, and wherein the one or more processors are configured to execute further processor-executable instructions stored in the non-transitory computer-readable medium to:

determine that the remainder satisfies the chunk size threshold;

generate a second segment based on the remainder;

generate, using the LLM, a second segment summary based on the second segment; and provide the second segment summary to the client device.

11. The system of claim 7, wherein the content segment comprises a subset of the group of consecutive utterances, wherein the subset comprises less than all of the utterances in the group of consecutive utterances and a remainder comprises the utterances from the group of consecutive utterances not included in the subset, and wherein the one or more processors are configured to execute further processor-executable instructions stored in the non-transitory computer-readable medium to:

in response to determining that a virtual conference has concluded:

determine that the remainder does not satisfy the chunk size threshold; and add the remainder to the content segment.

12. The system of claim 7, wherein the chunk size threshold comprises a minimum elapsed time, a maximum elapsed time, a minimum number of utterances, a maximum number of utterances, a minimum size for the group of consecutive utterances, or a maximum size for the group of consecutive utterances.

13. A non-transitory computer-readable medium comprising processor-executable instructions configured to cause one or more processors to:

receive, during a virtual conference from a client device, a request to generate a real-time summary of the virtual conference, a plurality of client devices participating in the virtual conference and exchanging audio and video streams;

receive, during the virtual conference, audio streams from the plurality of client devices participating the virtual conference;

execute, during the virtual conference, an automatic speech recognition ("ASR") model on the audio streams to generate a plurality of utterances from one or more participants;

generate a group of consecutive utterances from the plurality of utterances;

executing a trained machine learning ("ML") model to determine a content segment based on the group of consecutive utterances and a segmentation threshold;

receive an indication that the content segment was not generated;

determine that the group of consecutive utterances satisfies a chunk size threshold;

reduce the segmentation threshold to obtain a reduced segmentation threshold;

execute the trained ML model to generate the content segment based on the group of consecutive utterances and the reduced segmentation threshold;

generate, using a large language model ("LLM"), a segment summary based on the content segment; and provide the segment summary to the client device during the virtual conference.

14. The non-transitory computer-readable medium of claim 13, wherein the content segment comprises a subset of the group of consecutive utterances, wherein the subset comprises less than all of the utterances in the group of consecutive utterances and a remainder comprises the utterances from the group of consecutive utterances not included in the subset, and further comprising processor-executable instructions configured to cause the one or more processors to:

receive a second plurality of utterances generated by the ASR model of the audio streams;

generate a second group of consecutive utterances from the second plurality of utterances and the remainder;

determine a second segment based on the second group of consecutive utterances;

generate, using the LLM, a second segment summary based on the second segment; and provide the second segment summary to the client device.

15. The non-transitory computer-readable medium of claim 13, further comprising processor-executable instructions configured to cause the one or more processors to:

determining that the group of consecutive utterances does not satisfy the chunk size threshold;

receiving a second plurality of utterances generated by the ASR model of the audio streams;

generating a second group of consecutive utterances from the second plurality of utterances and the group of consecutive utterances;

determining a second segment based on the second group of consecutive utterances;

generate, using the LLM, a second segment summary based on the second segment; and provide the second segment summary to the client device.

16. The non-transitory computer-readable medium of claim 13, wherein the content segment comprises a subset of the group of consecutive utterances, wherein the subset comprises less than all of the utterances in the group of consecutive utterances and a remainder comprises the utterances from the group of consecutive utterances not included in the subset, and further comprising processor-executable instructions configured to cause the one or more processors to:

determine that the remainder satisfies the chunk size threshold;

generate a second segment based on the remainder;

generate, using the LLM, a second segment summary based on the second segment; and provide the second segment summary to the client device.

17. The non-transitory computer-readable medium of claim 13, wherein the content segment comprises a subset of the group of consecutive utterances, wherein the subset comprises less than all of the utterances in the group of consecutive utterances and a remainder comprises the utterances from the group of consecutive utterances not included in the subset, and further comprising processor-executable instructions configured to cause the one or more processors to:

in response to determining that a virtual conference has concluded:

determine that the remainder does not satisfy the chunk size threshold; and add the remainder to the content segment.

* * * * *